(12) United States Patent
Mintgen et al.

(10) Patent No.: US 7,703,377 B2
(45) Date of Patent: Apr. 27, 2010

(54) BEND-RESISTANT PISTON/CYLINDER UNIT

(75) Inventors: Rolf Mintgen, Thuer (DE); Jörg Hillen, Nörtershausen (DE); Peter Kohns, Vallendar (DE)

(73) Assignee: Stabilus GmbH, Koblenz (DE)

( * ) Notice: Subject to any disclaimer, the term of this patent is extended or adjusted under 35 U.S.C. 154(b) by 392 days.

(21) Appl. No.: 11/893,686

(22) Filed: Aug. 16, 2007

(65) Prior Publication Data

US 2008/0041680 A1    Feb. 21, 2008

(30) Foreign Application Priority Data

Aug. 19, 2006   (DE)   .................  10 2006 039 036

(51) Int. Cl.
  *F15B 15/14*   (2006.01)
  *F16F 9/02*    (2006.01)
(52) U.S. Cl. ................  92/51; 248/161; 267/225
(58) Field of Classification Search ................. 92/118, 92/161, 165 R, 51, 52, 53; 49/340, 324; 248/161; 267/64.26, 225; 297/344.18, 344.19; 296/100.1; 91/169
See application file for complete search history.

(56) References Cited

U.S. PATENT DOCUMENTS

| | | | |
|---|---|---|---|
| 4,485,996 A  * | 12/1984 | Beukema et al. ............ | 248/407 |
| 4,848,524 A | 7/1989 | Hosan et al. | |
| 5,979,845 A  * | 11/1999 | Battey et al. ................ | 248/161 |
| 5,992,815 A  * | 11/1999 | Metzdorf et al. ............... | 92/51 |
| 6,098,937 A  * | 8/2000 | Carnahan et al. ............ | 248/158 |
| 6,491,292 B2 * | 12/2002 | Stumm et al. ............... | 267/225 |
| 2002/0109052 A1* | 8/2002 | Jeon et al. .................... | 248/161 |

FOREIGN PATENT DOCUMENTS

| | | |
|---|---|---|
| DE | 36 27 138 | 2/1988 |
| DE | 196 36 202 | 3/1998 |
| DE | 198 19 377 | 11/1999 |

OTHER PUBLICATIONS

Search Report dated Apr. 24, 2007 for the corresponding German Application No. 10 2006 039 036.9.

* cited by examiner

*Primary Examiner*—Thomas E Lazo
(74) *Attorney, Agent, or Firm*—Cohen Pontani Lieberman & Pavane LLP

(57) ABSTRACT

A piston/cylinder unit is disclosed. The piston/cylinder unit includes a pressure tube having one end; a piston rod axially movable in the pressure tube, the piston rod extending through the one end of the pressure tube so that a portion of the piston rod is disposed outside the pressure tube; a casing tube attached to the portion of the piston rod, the casing tube at least partially enveloping the pressure tube; and a bush attached to the pressure tube, wherein the bush is disposed between the casing tube and the pressure tube so that the casing tube is axially movable relative to the pressure tube via the bush.

22 Claims, 4 Drawing Sheets

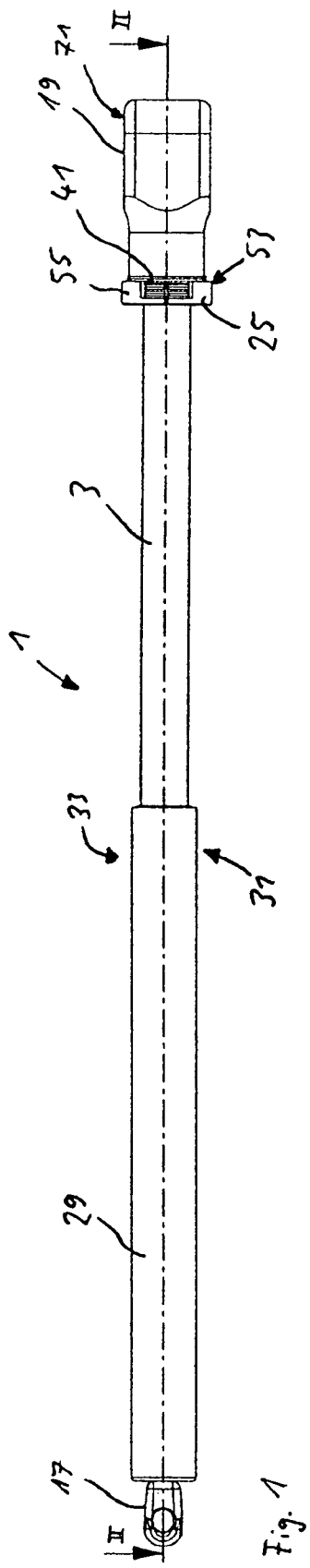
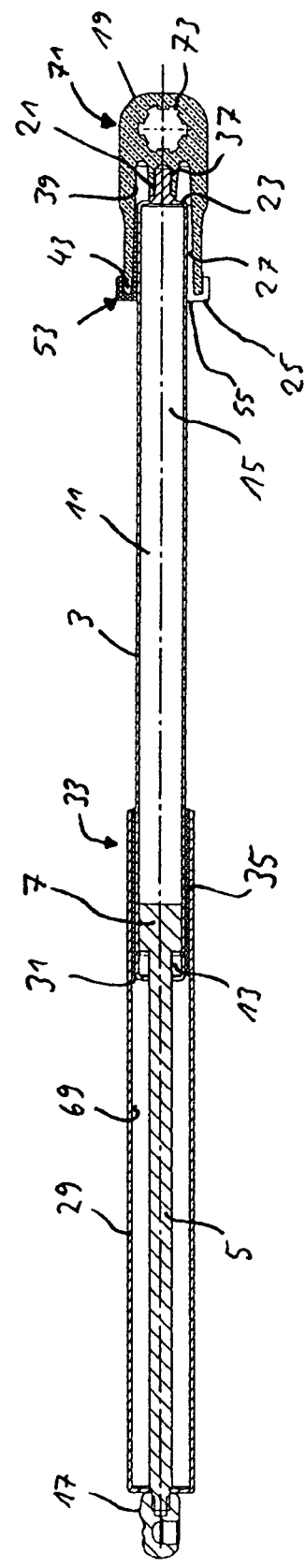

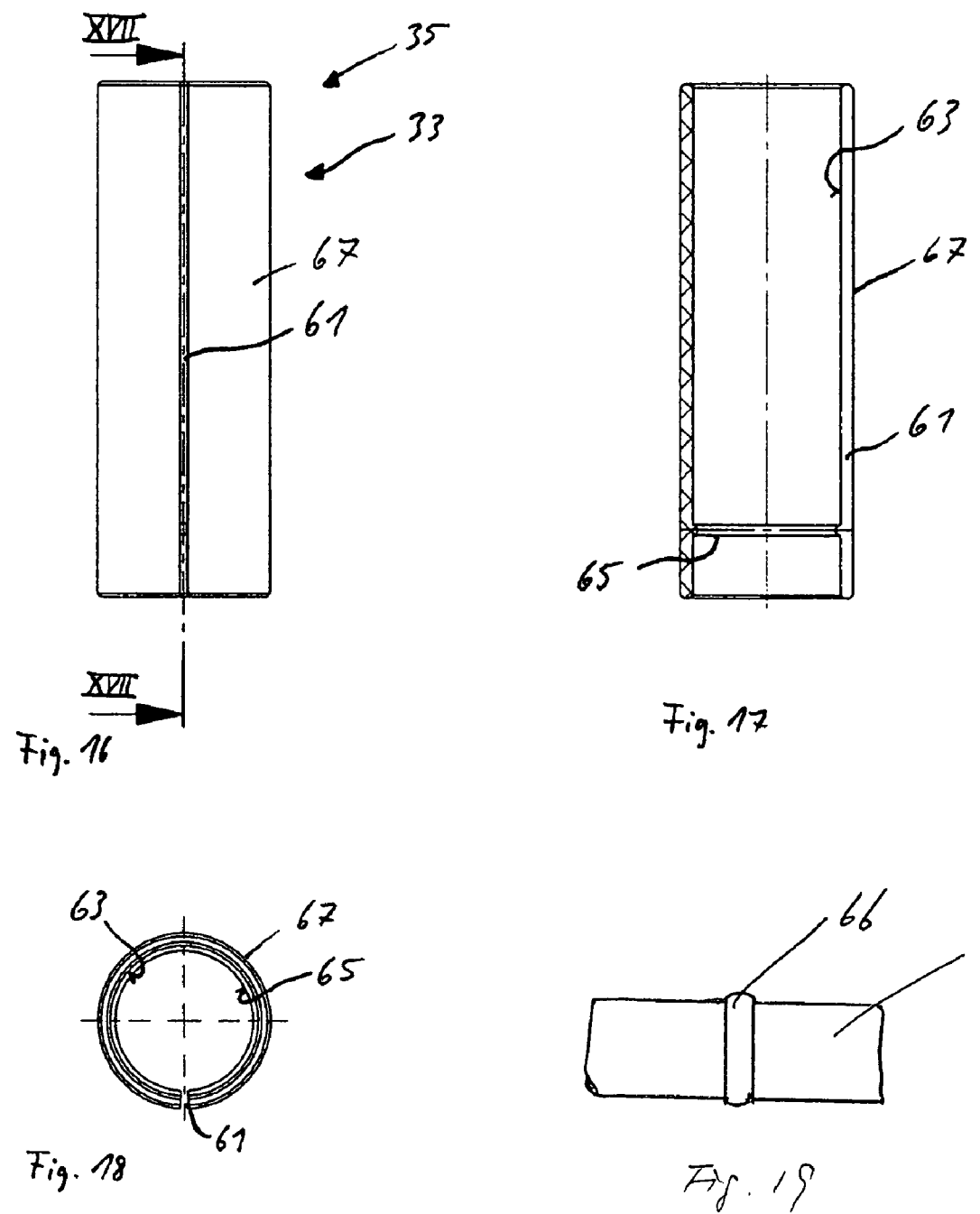

BEND-RESISTANT PISTON/CYLINDER UNIT

BACKGROUND OF THE INVENTION

1. Field of the Invention

The invention relates to a piston/cylinder unit having a pressure tube, a piston rod mounted axially displaceably in the pressure tube and a casing tube at least partially enveloping the pressure tube and assigned to the piston rod.

2. Description of the Related Art

Generic piston/cylinder units are known. They are employed, for example, in height-adjustable chairs or may be used for power assistance on flaps, for example on flaps of vehicles. DE 196 36 202 C2 discloses a guide bush for parts displaceable telescopically one in the other. DE 198 19 377 C2 discloses a piston/cylinder assembly with a displaceable connection member.

SUMMARY OF THE INVENTION

An object of the invention is to provide an improved piston/cylinder unit which, in particular, is more bend-resistant and/or is suitable for the transmission of a torque.

The object is achieved by means of a piston/cylinder unit including a pressure tube, a piston rod mounted axially displaceably in the pressure tube and a casing tube at least partially enveloping the pressure tube and assigned to the piston rod. A bush assigned to the pressure tube is arranged between the casing tube and the pressure tube, the casing tube being mounted displaceably with respect to the pressure tube via the bush. Advantageously, therefore, the bush can implement a rigid coaxial plain bearing for the casing tube. The casing tube can therefore be displaced slideably along the bush coaxially with respect to the pressure tube. Advantageously, moments, particularly bending moments, can thereby be transmitted between the pressure tube and the casing tube. In particular, it is possible to transmit these torques so that the internal structure of the piston/cylinder unit is not affected by these. The piston/cylinder unit may be, for example, a pneumatic spring. Normally, in such pneumatic springs, the piston rod projected into the pressure tube is somewhat unsuitable for transmitting moments between the piston rod and the pressure tube. In the worst case, an introduction of moments into the piston rod may lead to leakages of the pneumatic spring. Precisely those leaks which are caused, in particular, by damage to corresponding pressure seals can be prevented by the external moment transmission taking place via the casing tube. Thus, by means of the casing tube, which is designed here as a guide tube, it is possible to produce a comparatively bend-resistant piston/cylinder unit, in particular a pneumatic spring. Such a piston/cylinder unit can therefore readily absorb and transmit not only the linear generation of force normally taking place, but also forces occurring at an angle to the mid-axis of the piston/cylinder unit, that is to say absorb and transmit, without damage, moments induced by these. The transmission of the bending moments thus induced can take place by means of the plain-bearing mounting of the casing tube implemented by the bush, without any appreciable impairment in the customary linear force transmission, that is to say, for example, the spring function of the piston/cylinder unit. It is thereby even possible to employ the piston/cylinder unit as a drive, for example as a link of such a drive. For this purpose, the piston/cylinder unit can be pivoted correspondingly by means of a suitable drive which introduces a torque into the piston/cylinder unit.

A preferred exemplary embodiment of the piston/cylinder unit is characterized in that the pressure tube has a receptacle arranged opposite the bush. Forces and/or moments can be transmitted to the pressure tube of the spring damper unit by means of the receptacle.

A further preferred exemplary embodiment of the piston/cylinder unit is distinguished in that the receptacle is fixed to the pressure tube, in particular screwed and/or frictionally fixed to the latter. The introduced forces and/or moments can thus be transmitted via the fixing.

A further preferred exemplary embodiment of the piston/cylinder unit is distinguished in that the receptacle at least partially overlaps the pressure tube. The overlap may be utilized for introducing the forces and/or moments into the pressure tube as smoothly as possible, that is to say over a large area.

A further preferred exemplary embodiment of the piston/cylinder unit is distinguished in that a continuous gap remains between the pressure tube and the receptacle. Advantageously, the gap may serve for tolerance compensation at the joint between the receptacle and the pressure tube.

A further preferred exemplary embodiment of the piston/cylinder unit is distinguished in that the gap tapers conically. The receptacle can thus advantageously be pushed over the pressure tube more easily, thus facilitating the mounting of the receptacle on the pressure tube.

A further preferred exemplary embodiment of the piston/cylinder unit is distinguished in that a slotted sleeve, in particular a conically designed cone sleeve, is introduced into the gap. The sleeve can thus be introduced into the gap so as to surround the pressure tube. This results, in the conical gap, in a wedge effect which can bring about an additional frictional fixing of the receptacle on the pressure tube by means of the sleeve. It is conceivable to design the inside diameter of the sleeve so as to be slightly smaller than the outside diameter of the pressure tube. For this purpose, the slot provided in the sleeve may serve for tolerance compensation. A press fit between the sleeve and the pressure tube is consequently obtained. Moreover, as a result of this, the sleeve deviates insignificantly from the circular shape.

A further preferred exemplary embodiment of the piston/cylinder unit is distinguished in that the sleeve, in particular the cone sleeve, has an annular recess. Other components of the piston/cylinder unit can be introduced into this annular recess, for example in order to fix them there.

A further preferred exemplary embodiment of the piston/cylinder unit is distinguished in that one end of the receptacle is introduced into the recess. The receptacle can thus serve as a limit stop and/or as centring and/or fixing for the receptacle.

A further preferred exemplary embodiment of the piston/cylinder unit is distinguished in that the receptacle is fixed positively in the recess. The sleeve and the receptacle can thus be connected firmly to one another via the positive connection.

A further preferred exemplary embodiment of the piston/cylinder unit is distinguished in that the positive fixing takes place via a latching device. It is thus possible, for mounting the receptacle in the recess of the sleeve, simply to latch the two components with one another via the latching device.

A further preferred exemplary embodiment of the piston/cylinder unit is distinguished in that the latching device has an internal toothing of the recess and an external toothing, engaging into the internal toothing, of the receptacle. The toothings may in this case be configured such that they allow pushing one into the other in steps, thus implementing a multiple latching device. For this purpose, it is possible to push the components one into the other in steps until they are firmly connected to one another. The corresponding toothings may, for this purpose, be arranged in opposition to one another, for example in each case in a sawtooth shape.

A further preferred exemplary embodiment of the piston/cylinder unit is distinguished in that the bush is slotted. Since the slot is correspondingly present, the bush can therefore be expanded. This may advantageously be utilized for mounting the bush on the pressure tube of the piston/cylinder unit. A corresponding expansion of the bush has the effect that this deviates insignificantly from the circular shape.

A further preferred exemplary embodiment of the piston/cylinder unit is distinguished in that the bush has an inner collar which, for axial fixing on the pressure tube, engages into a continuous bead of the pressure tube, or vice versa. The bush can thus be fixed positively by means of the collar and the bead to the pressure tube so as to be secured against axial displacement. The bush may advantageously be expanded, for mounting, to an extent such that the corresponding collar slides over the pressure tube or the bush until the collar latches in the bead of the pressure tube or the bush. Thus, for mounting, the bush can be expanded further than is the case in the mounted state.

A further preferred exemplary embodiment of the piston/cylinder unit is distinguished in that the casing tube is assigned to the piston rod via a ball socket. It is consequently possible, therefore, to assign linear forces introduced into the ball socket of the piston/cylinder unit to the piston rod and to the casing tube equally. The casing tube and the piston rod are thus coupled kinematically, so that a displacement of the piston rod is accompanied automatically by a displacement of the casing tube. The linear forces of the piston/cylinder unit, for example of the pneumatic spring, which normally occur can be transmitted via the ball socket. However, by the casing tube being assigned to the ball socket, it is additionally possible also for the torques possibly transmitted by the piston/cylinder unit to be transmitted to other components assigned to the ball socket. Such components may be, for example, an electrically, hydraulically and/or pneumatically actuable flap of a motor vehicle and/or any other actuated and/or actuable component of any technical device.

A further preferred exemplary embodiment of the piston/cylinder unit is distinguished in that the bush has an outer sliding face on which the casing tube is mounted axially slideably. The casing tube can thus slide with its inner face on the outer sliding face of the bush. Owing to this mounting, it is possible to transmit bending moments between the pressure tube and the casing tube of the piston/cylinder unit. For this purpose, it is conceivable for the bush to have a comparatively rigid design, in order thereby to allow a particularly low-loss and direct transmission of such bending moments. The bush may advantageously be firmly assigned to the pressure tube at a front end of the latter. This makes it possible that, with the piston rod pushed in, the lever arm between the bush and the end of the casing tube is reduced. As described above, the end of the casing tube may have the ball socket. It is thus advantageously possible, in the pushed-in state of the piston/cylinder unit, to transmit particularly high bending moments via the latter. This may be advantageous, for example, in order to transmit the comparatively high torques which are necessary at the commencement of an opening movement of a flap, for example of a tailgate of a vehicle. Depending on the design of the kinematics, in an advanced stage of movement, the linear force fraction generated by the piston/cylinder unit can increasingly ensure the movement of the flap.

A further preferred exemplary embodiment of the piston/cylinder unit is distinguished in that the stress-free inside diameter of the bush is smaller than the outside diameter of the pressure tube. It is thereby possible to connect the bush to the pressure tube in the form of a press fit. For this purpose, the corresponding slot of the bush can be enlarged correspondingly, that is to say the bush can be expanded. The corresponding stress of the bush results in an additional friction connection. On account of the required expansion of the bush, the latter may deviate at least insignificantly from the circular shape. This may advantageously be utilized for the compensation of tolerances. For example, a tendency of the piston/cylinder unit to rattle, which possibly exists, can thereby be reduced.

A further preferred exemplary embodiment of the piston/cylinder unit is distinguished in that the bush has a resiliently elastic material. The required expansion of the bush can thereby be cancelled completely or partially.

A further preferred exemplary embodiment of the piston/cylinder unit is distinguished in that the bush and/or the casing tube have/has a material lowering the sliding friction, in particular a coating. The friction occurring on the plain bearing formed by the bush can thereby be minimized.

A further preferred exemplary embodiment of the piston/cylinder unit is distinguished in that the receptacle has a moment transmission device, in particular an internal toothing, for the introduction of torques into the piston/cylinder unit. Torques can thus advantageously be transmitted to the piston/cylinder unit via the moment transmission device. For example, the moment transmission device may be coupled to a corresponding pivoting drive, in order thereby, for example, to use the piston/cylinder unit as a link of a corresponding pivoting drive.

A further preferred exemplary embodiment of the piston/cylinder unit is distinguished in that an introduced torque is transmitted from the receptacle via the pressure tube and via the bush to the casing tube. The introduced torque can thus advantageously be transferred via the entire piston/cylinder unit, for example as far as the ball socket, and via the latter, for example, to a component to be driven.

Further advantages, features and details of the invention may be gathered from the following description which describes in detail various exemplary embodiments with reference to the drawing. Identical, similar and/or functionally identical parts are given the same reference symbols.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 shows a side view of a piston/cylinder unit;

FIG. 2 shows a longitudinal section through the piston/cylinder unit shown in FIG. 1 along the line II-II;

FIG. 16 shows a side view of a slotted bush of the piston/cylinder unit shown in FIG. 1;

FIG. 17 shows a longitudinal section through the bush shown in FIG. 16 along the line XVII-XVII;

FIG. 18 shows a top view of the bush shown in FIG. 16; and

FIG. 19 shows a bead formed on the pressure tube.

DETAILED DESCRIPTION OF THE PREFERRED EMBODIMENTS

Figure 3:
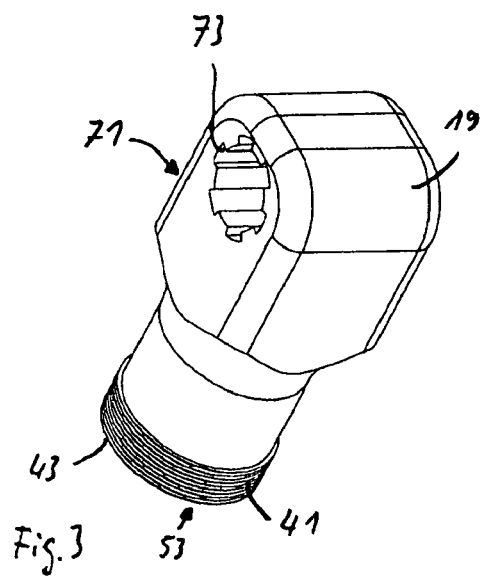
FIG. 3 shows a three-dimensional view, obliquely from above, of a receptacle of the piston/cylinder unit shown in FIG. 1.

FIG. 1 shows a side view of a piston/cylinder unit 1. FIG. 2 shows a sectional view of the piston/cylinder unit 1 shown in FIG. 1 along the line II-II. The piston/cylinder unit 1 shown in FIGS. 1 and 2 has a pressure tube 3 and a piston rod 5 projecting into the pressure tube 3. The piston/cylinder unit 1 may be, for example, a pneumatic spring or also a damper. For this purpose, the piston/cylinder unit 1 may have a piston 7 which is assigned or attached to the piston rod 5 and which divides a pressure space 11 of the pressure tube 3 into a first working space 13 and a second working space 15. Owing to the pressure prevailing in the working spaces 13 and 15 or in the pressure space 11, the piston rod 5 can be displaced, correspondingly to the operating principle of a pneumatic spring, axially in relation to the pressure tube 3 counter to or assisted by the pressure prevailing in the pressure space 11.

For the transmission of forces, the piston rod 5 is connected to a ball socket 17. For this purpose, the ball socket 17 may be connected to the piston rod 5 in a known way such as, for example, by screwing, welding, or riveting. Likewise for the transmission of forces, the pressure tube 3 is connected to a receptacle 19. The connection of the receptacle 19 may take place in any known way such as, for example, by screwing, riveting, or welding. In the present case, the receptacle 19 is screwed to the piston/cylinder unit 1 at one end 23 of the pressure tube 3 by means of a screw connection 21. Moreover, the receptacle 19 is assigned or attached via a cone sleeve 25 to the pressure tube 3 of the piston/cylinder unit 1. For this purpose, the cone sleeve 25 is arranged, so as to surround the pressure tube 3 in the region of the end 23, in a conically shaped gap 27 remaining between the receptacle 19 and the pressure tube 3.

Moreover, the piston/cylinder unit 1 has a casing tube 29. The casing tube 29 is likewise connected firmly to the ball socket 17 and surrounds the piston rod 5. Moreover, the casing tube 29 at least partially surrounds the pressure tube 3. The casing tube 29 thus surrounds the other end 31 of the pressure tube 3. In the region of the other end 31 of the pressure tube 3, the piston/cylinder unit 1 has a plain bearing 33. By means of the plain bearing 33, the casing tube 29 is mounted so as to be displaceable coaxially with respect to the pressure tube 3 of the piston/cylinder unit 1. The plain bearing 33 has a bush 35 attached in the region of the other end 31 of the pressure tube 3. The bush 35 is assigned firmly to the pressure tube 3 of the piston/cylinder unit 1 by means of any connection technique, for example positively, frictionally and/or in a materially integral manner. To optimize the plain bearing 33, the bush 35 may have a material reducing the coefficient of friction, in particular a corresponding coating. Furthermore, the bush 35 may be produced integrally and in one piece with the pressure tube 3.

FIGS. 3-8 show various views, in particular views of details and sectional views, of the receptacle 19 of the piston/cylinder unit 1 shown in FIGS. 1 and 2. FIGS. 9-15 show various views, in particular views of details and sectional views, of the cone sleeve 25 of the piston/cylinder unit 1 shown in FIGS. 1 and 2. The cone sleeve 25 is assigned or attached positively and/or frictionally to the receptacle 19. The functioning and the connection of the receptacle 19 and of the cone sleeve 25 to one another and/or to the pressure tube 3 are explained in more detail below with reference to FIGS. 3-15.

Figure 4:
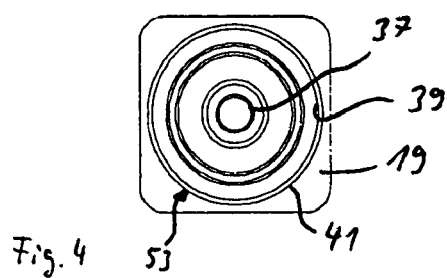
FIG. 4 shows an internal view from below into the receptacle shown in FIG. 3.
Figure 5:
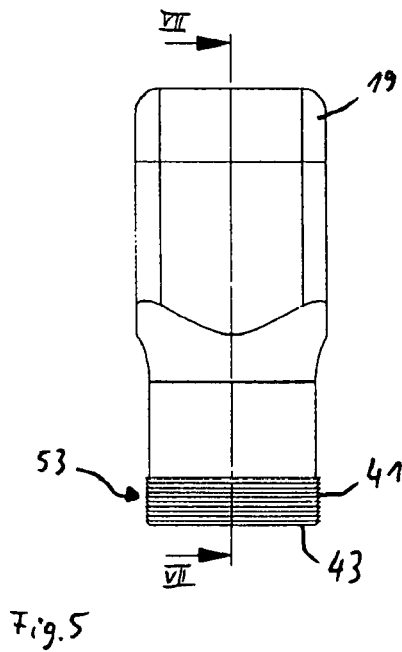
FIG. 5 shows a side view of the receptacle shown in FIG. 3.
Figure 6:
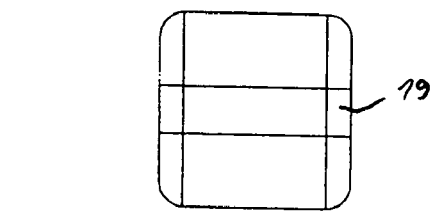
FIG. 6 shows a top view of the receptacle shown in FIG. 3.
Figure 7:
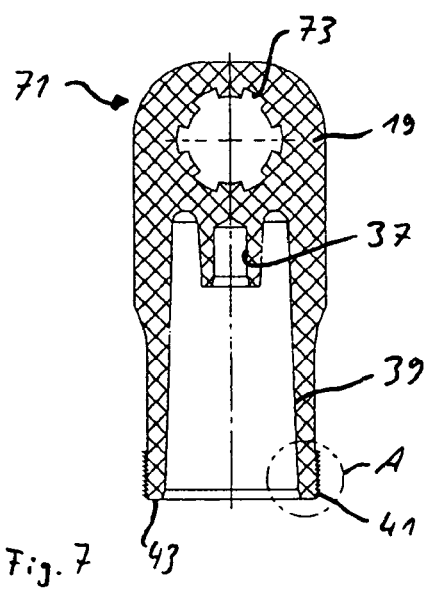
FIG. 7 shows a longitudinal section through the receptacle shown in FIG. 5 along the line VII-VII.

The receptacle 19 may be screwed to the pressure tube 3 and, for this purpose, has an internal thread 37 which can be seen in FIGS. 4 and 7. If the thread arranged on the pressure tube is a self-cutting thread, the region identified by 37 comprises merely a bore in the wall of which a thread is cut during mounting. For mounting the receptacle 19 together with the pressure tube 3, the pressure tube 3 can be introduced into a conical recess 39, as is evident in FIGS. 4 and 7. The conical recess 39 has a larger inside diameter than the pressure tube 3, so that the conical gap 27 between the cylindrical surface of the pressure tube 3 and the conical inner face of the recess 39 remains.

Figure 8:
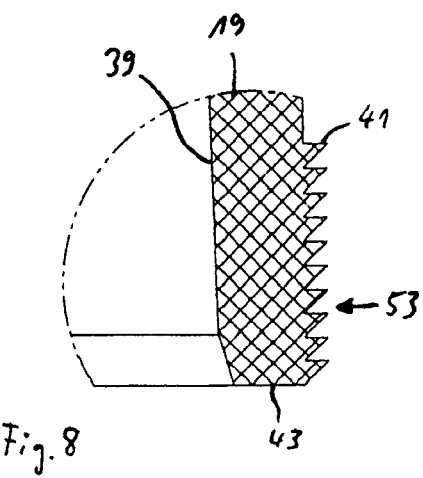
FIG. 8 shows a view of a detail of the receptacle shown in FIG. 7, corresponding to the circle A.

It is clear in FIGS. 3, 5, 7 and 8 that the receptacle 19 has a sawtooth-shaped external toothing 41. The external toothing 41 is introduced, on the outside facing away from the pressure tube 3, at a front end 43 of the receptacle 19. FIG. 8 shows a view of a detail of the external toothing 41 of the receptacle 19 along the circle A from FIG. 7. It can be seen that the external toothing 41 has a sawtooth-shaped configuration, the flatter-rising flanks rising from the front end 43 at an inclination with, for example, an angle of 45° to a mid-axis of the receptacle 19. The rising flanks have adjoining them in each case a steep drop, in particular running perpendicularly with respect to the mid-axis of the receptacle. The external toothing 41 is designed, in the region of the end 43, to surround the receptacle 19 annularly. It is also conceivable, however, to provide the external toothing 41 only partially, that is to say interrupted peripherally.

The cone sleeve 25 illustrated in FIGS. 9-15 has an essentially cylindrically designed inner face 45. The inside diameter of the cylinder thereby formed may be slightly smaller than the outside diameter of the pressure tube 3. The cone sleeve 25 has a slot 47, so that it can be expanded to the outside diameter of the pressure tube 3. It is consequently possible, for example before the mounting of the receptacle 19, to push the cone sleeve 25 onto the pressure tube 3 of the piston/cylinder unit 1.

Figure 9:
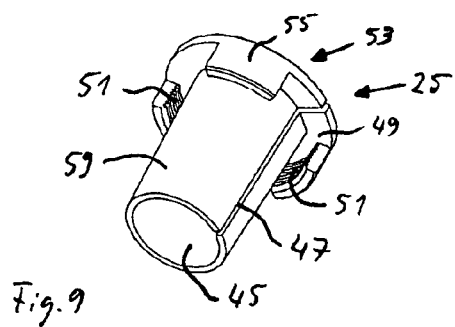
FIG. 9 shows a three-dimensional view, obliquely from below, of a cone sleeve of the piston/cylinder unit shown in FIG. 1.
Figure 12:
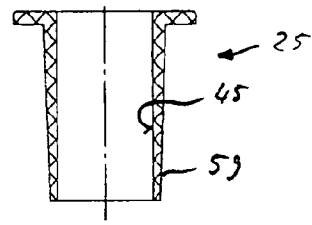
FIG. 12 shows a longitudinal section through the cone sleeve shown in FIG. 11 along the line XII-XII.
Figure 10:
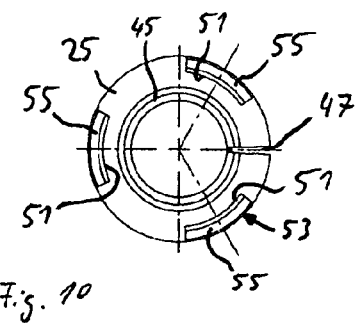
FIG. 10 shows a bottom view of the cone sleeve shown in FIG. 9.
Figure 13:
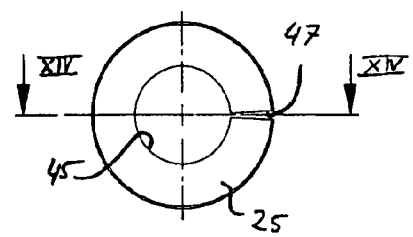
FIG. 13 shows a top view of the cone sleeve shown in FIG. 9.
Figure 14:
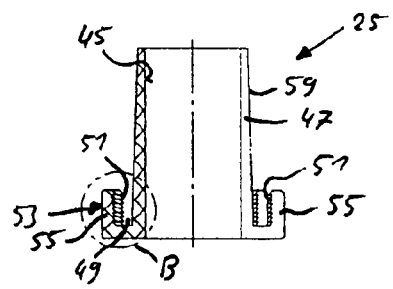
FIG. 14 shows a longitudinal section through the cone sleeve shown in FIG. 13 along the line XIV-XIV.
Figure 11:
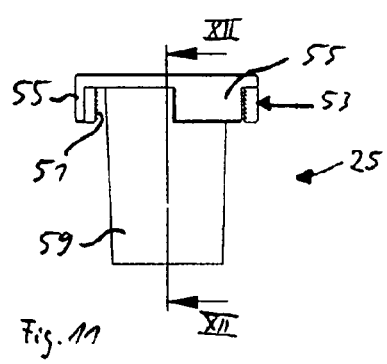
FIG. 11 shows a side view of the cone sleeve shown in FIG. 9.
Figure 15:
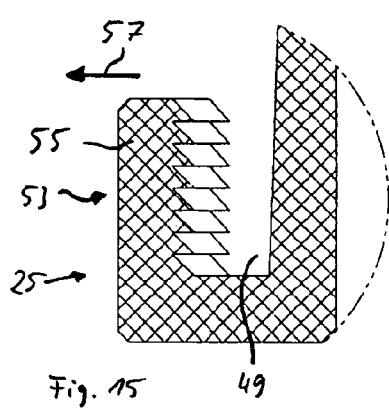
FIG. 15 shows a view of a detail of the cone sleeve shown in FIG. 14, corresponding to the circle B.

It can be seen in FIGS. 9, 11 and 14 that the cone sleeve 25 has a peripheral interrupted recess 49 having altogether three segments. The peripheral recess is thus interrupted threefold and can receive the front end 43 of the receptacle 19. For the positive fixing of the receptacle 19 in the recess 49 of the cone sleeve 25, the recess 49 of the cone sleeve 25 has an internal toothing 51. The internal toothing 51 can be seen in the view of the detail of FIG. 15 which corresponds to the circle B from FIG. 14. The internal toothing 51 likewise has a sawtooth-shaped configuration correspondingly to the external toothing 41. In this case, the rising flanks of the sawtooth run in the direction of the interior of the recess 49 of the cone sleeve 25. It is therefore possible to introduce the front end 43 of the receptacle 19 into the recess 49, while the flat-rising flanks of the sawtooth can slide along on one another, but, in the case of an opposite movement, the steep flanks catch with one another. Consequently, the internal toothing 51 and the external toothing 41 form a latching device 53 for the positive fixing of the cone sleeve 25 to the receptacle 19. For this purpose, the latching device 53 has, in particular, three elastically movable latching arms 55 which are formed by side walls of the recess 49. In FIG. 15, an arrow 57 indicates that the latching arms 55 can spring out elastically radially outwards for the latching of the latching device 53.

Furthermore, the cone sleeve 25 has a conical outer face 59. The face 59 can be applied over a large area, in particular frictionally, to the likewise conical recess 39 of the receptacle 19 as a result of or after the latching of the latching device 53. It is clear that, by the cone sleeve 25 being pushed into the recess 39 of the receptacle 19, that is to say into the conical gap 27, a wedging of the three components, that is to say of the pressure tube 3, of the receptacle 19 and of the cone sleeve 25, can be brought about in addition to the action of the latching device 53. The stress generated by the wedge effect may advantageously be utilized for a frictional fixing of the receptacle 19 to the pressure tube 3 of the piston/cylinder unit 1 via the cone sleeve 25 and/or for tolerance compensation.

FIGS. 16-18 show various views of the bush 35, forming the plain bearing 33, of the piston/cylinder unit 1. As is evident in FIGS. 16 and 17, the bush 35 has a slot 61. It is consequently possible to design the inside diameter of the bush 35 so as to be slightly smaller than the outside diameter of the pressure tube 3. To mount the bush 35 together with the pressure tube 3, the bush 35 can be expanded, as far as is necessary, along the slot 61. For this purpose, the bush 35 may have a resiliently elastic material. Furthermore, it is thereby possible for the bush 35 to deviate insignificantly from the circular or cylindrical outer shape.

It can be seen in FIG. 17 that an essentially cylindrical inner face 63 of the bush 35 has a peripheral collar 65. This collar 65 can engage into a corresponding bead 66 (see FIG. 19) of the pressure tube 3 for the positive fixing of the bush 35 to the pressure tube 3. Consequently, the bush 35 can be secured positively and/or frictionally against slipping out of place axially in relation to the pressure tube 3 of the piston/cylinder unit 1. As is clear in FIGS. 16-18, the bush 35 has an outer sliding face 67. The sliding face 67 may have a material reducing the sliding friction, in particular may be coated with such a material. In the mounted state, the sliding face 67 bears against an inner face 69 of the casing tube 29. Consequently, the plain bearing 33 is implemented by the sliding face 67 and the essentially cylindrical inner face 69 of the pressure tube 3. Bending moments can be transmitted between the pressure tube 3 and the casing tube 29 via the bush 35 and the plain bearing 33.

The piston/cylinder unit 1 can advantageously be used for the transmission of torques, for example as a link of a corresponding pivoting drive. For this purpose, the receptacle 19 has a torque transmission device 71 with an internal toothing 73. The internal toothing 73 may, for example, mesh with a corresponding pinion, not illustrated, of a pivoting drive. A torque possibly introduced by the internal toothing 73 of the torque transmission device 71 of the receptacle 19 can be transmitted from the receptacle 19 via the cone sleeve 25 and/or the screw connection 21, via the pressure tube 3, via the bush 35 of the plain bearing 33 and via the casing tube 29 to the ball socket 17 of the piston/cylinder unit 1. A torque can consequently be transmitted via the piston/cylinder unit 1 between the receptacle 19 and the ball socket 17. It is clear that, by means of the casing tube 29 additionally provided, which is supported on the pressure tube 3 by means of the plain bearing 33, any bending moments introduced via the ball socket 17 are not transmitted or are transmitted to only an insignificantly slight extent to the piston rod 5 of the piston/cylinder unit 1. Instead, the transmission of bending moments takes place, as already described, as far as the receptacle 19 of the piston/cylinder unit 1, the piston rod 5 being bypassed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston/cylinder unit comprising:
a pressure tube having a first end and a second end;
a piston rod axially movable in the pressure tube, the piston rod extending through the first end of the pressure tube so that a portion of the piston rod is disposed outside the pressure tube;
a casing tube attached to the portion of the piston rod, the casing tube at least partially enveloping the pressure tube; and
a bush attached to the pressure tube,
wherein the bush is disposed between the casing tube and the pressure tube so that the casing tube is axially movable relative to the pressure tube via the bush; and
wherein the bush has an outer sliding surface on which the casing tube is axially slideably mounted.

2. The piston/cylinder unit of claim 1, further comprising a receptacle arranged on the second end of the pressure tube.

3. The piston/cylinder unit of claim 2, wherein the receptacle is fixed to the pressure tube.

4. The piston/cylinder unit of claim 3, wherein the receptacle is threadedly or frictionally fixed to the pressure tube.

5. The piston/cylinder unit of claim 2, wherein the receptacle at least partially envelops the pressure tube.

6. The piston/cylinder unit of claim 5, wherein there is a continuous radial gap between the receptacle and the pressure tube.

7. The piston/cylinder unit of claim 6, wherein the radial gap tapers conically.

8. The piston/cylinder unit of claim 6, further comprising a slotted sleeve which is disposed in the radial gap.

9. The piston/cylinder unit of claim 8, wherein the slotted sleeve has an annular recess.

10. The piston/cylinder unit of claim 9, wherein the receptacle has one end which is received in the annular recess.

11. The piston/cylinder unit of claim 10, wherein the one end of the receptacle is fixedly received in the annular recess.

12. The piston/cylinder unit of claim 11, wherein the one end of the receptacle is fixedly received in the annular recess via a latching device.

13. The piston/cylinder unit of claim 12, wherein the slotted sleeve has a part which defines the annular recess, the part having internal teeth, the one end of the receptacle having external teeth which engage the internal teeth, the latching device comprising the internal teeth and the external teeth.

14. The piston/cylinder unit of claim 2, wherein the receptacle has a toothed hole for introducing a torque into the piston/cylinder unit.

15. The piston/cylinder unit of claim 2, wherein a torque introduced by the receptacle is transmitted from the receptacle to the casing tube through the pressure tube and the bush.

16. The piston/cylinder unit of claim 1, wherein the bush is slotted.

17. The piston/cylinder unit of claim 1, wherein the pressure tube has an external bead, and the bush has an inner collar which engages the external bead of the pressure tube so that the bush is axially fixed relative to the pressure tube.

18. The piston/cylinder unit of claim 1, further comprising a ball socket which is attached to the portion of the piston rod, the casing tube being attached to the portion of the piston rod via the ball socket.

19. The piston/cylinder unit of claim 1, wherein the bush has an inside diameter which is smaller than an outer diameter of the pressure tube.

20. The piston/cylinder unit of claim 1, wherein the bush comprises a resiliently elastic material.

21. The piston/cylinder unit of claim 1, wherein at least one of the bush and the casing tube comprises a friction-lowering material.

22. The piston/cylinder unit of claim 1, wherein at least one of the bush and the casing tube comprises a friction-lowering coating.

* * * * *